United States Patent [19]  [11]  4,118,513
Braund et al.  [45]  Oct. 3, 1978

[54] METHOD OF FORMULATING DAIRY CATTLE RATIONS

[75] Inventors: Darwin G. Braund, Fayetteville; Kendall L. Dolge, Manlius; Richard L. Goings, Fabius; Robert L. Steele, Syracuse, all of N.Y.

[73] Assignee: Agway, Inc., Dewitt, N.Y.

[21] Appl. No.: 711,095

[22] Filed: Aug. 2, 1976

[51] Int. Cl.$^2$ ............................................... A23K 1/00
[52] U.S. Cl. ..................................... 426/2; 426/623; 426/630; 426/636; 426/807
[58] Field of Search ..................... 426/2, 69, 623, 635, 426/636, 656, 807

[56] References Cited

PUBLICATIONS

Morrison, "Feeds and Feeding", Morrison Publishing Company, 22 Edition, (1957), pp. 80–83, 627–656, 1082–1089, 1114–1119 & 1132–1136.
Burroughs et al., "Protein Physiology & its Application in the Lactating Cow, The Metabolizable Protein Feeding Standard", J. Animal Sci., vol. 41, (1975), pp. 933–944.
Wohlt et al., "Measurement of Protein Solubility in Common Feedstuffs," J. of Animal Science, vol. 56, (1973), pp. 1052–1057.
Bergen et al., "Changes in Nitrogeneous Compounds of Corn Plant During Ensiling & Effects on Dry Matter Intake by Sheep", J. Animal Sci., vol. 59, (1974), pp. 629–637.

Primary Examiner—R. B. Penland
Attorney, Agent, or Firm—Charles S. McGuire

[57] ABSTRACT

Dairy cattle rations are formulated to optimize milk production by balancing the proportion of soluble and insoluble protein in the total dietary protein. The ration may include both forage and concentrate portions, in which case the forage portion may consist of grazing and/or available stored forage with the composition of the concentrate being adjusted as required to provide the required balance of soluble and insoluble protein. The total protein intake is established according to standard recommended levels based on a particular cow or herd's production level, and other factors. The proportion of the total protein which is soluble in the cow's rumen is limited to not more than 25%, but some soluble protein, preferably in a range of about 10% to 20% is provided since it is this protein which is used by the microorganisms in the rumen which are, in turn, used by the cow as protein.

5 Claims, No Drawings

METHOD OF FORMULATING DAIRY CATTLE RATIONS

BACKGROUND OF THE INVENTION

The present invention relates to dietary programs for dairy cattle and, more specifically, to the protein portion of dietary programs designed to increase milk production of dairy cows.

It has been recognized that the protein content of a dairy cow's diet is an important factor in the quantity of milk produced. Much research has been devoted to determining the relationship between total protein intake and milk production. In this context, the term "total protein" is used to denote both protein substances and non-protein nitrogen sources such as urea. It is standard procedure to calculate the total protein content of a feed material based on its nitrogen content. Since protein contains approximately 16% nitrogen, total protein content is expressed as 6.25 times the nitrogen percentage content of a given material. That is, if the composition of a material includes 2% nitrogen, its total protein content is 12.5% (6.25 × 2%).

In the unique digestive system of ruminant animals, a portion of the food is broken down by the fluid and microorganisms present in the rumeno-reticular compartment, the first and largest of the stomach compartments. Certain protein substances are degraded to soluble peptides, amino acids and/or ammonia in the rumen, while others remain chemically intact until digested in the abomasum or small intestine. For purposes of the present discussion, such substances are termed soluble and insoluble proteins, respectively. Thus, the total protein content of a given ration may be expressed in terms of the percentages of soluble and insoluble protein.

The prior art includes studies of ruminant nutrition which suggest that weight gain may be accelerated in beef cattle and wool growth increased in sheep by inhibiting protein breakdown until the later stages of the digestive process. For example, coating with fats and vegetable oils, heat treatment and reaction with specific chemicals are among the procedures suggested for improving the nutrient usefulness for sheep and beef cattle. The implications of prior research in the area of protein solubility, as previously defined, are confined to weight gain and wool growth, and suggest that the level of protein solubility should be as low as possible. That is, for the best body and wool growth, ideally, all protein should be insoluble in the rumen.

BRIEF SUMMARY & OBJECTS OF THE INVENTION

The principal object of the present invention is to provide novel dietary programs which will increase milk production in dairy cattle. Although it has been known that both soluble and insoluble protein are required in the total ration, the present invention establishes relative proportions and amounts required for significantly increased milk production beyond that attained through application of prior knowledge. The total ration usually includes one or more forages and a supplemental feed, hereinafter termed a concentrate, which typically contains a number of ingredients blended to provide specific nutritional values which complement those provided by the forage. The invention may be practiced under conditions where the cattle are allowed to graze and/or to eat stored forages ad libitum, and where the amounts fed of both forage and concentrate are controlled and measured. In ad libitum feeding situations, including grazing, standard dairy practices provide methods for estimating with reasonable accuracy the total amount of forage consumed.

A further object of the invention is to provide a novel method of balancing the forage and concentrate portions of the dietary program of dairy cattle in order to increase milk production.

A still further object is to provide unique methods of formulating dietary programs which will result in a milk production response in diary cattle which already produce high milk yields.

Other objects will in part be obvious and will in part appear hereinafter.

The underlying concept of the invention is that a balance between soluble and insoluble protein substances may be established to achieve a milk production response. The validity of the concept is demonstrated by a carefully controlled research trial, and is further supported by field tests under semi-controlled conditions, as set forth later herein.

Samples of the forage(s) are analyzed to determine the amount and solubility of its(their) protein content, as well as other nutritional features. The required amount and solubility level of protein in the concentrate which is fed to the cattle to complete the total ration is calculated from the corresponding values for the forage(s). Likewise, the total amount of concentrate to be fed is calculated after knowing the amount and nutrient content of forage(s) consumed.

DETAILED DESCRIPTION

A trial was conducted under carefully controlled conditions at the Agway Cooperative Research Farm in Fabius, New York, to investigate the influence of varying protein solubility upon ration utilization and performance of high producing dairy cows in early lactation. A further object of the trial was to investigate the position of urea as a potentially totally-soluble nitrogen source in meeting the protein requirements of high producing dairy cows. A total of 80 cows were divided into four equal groups. All 80 cows were fed the same forage(corn silage) and each group was additionally fed a concentrate(grain). All cows in the test program were fed the same silage and concentrate for a pre-test period, namely, until the fifth Tuesday postpartum and all averaged at least 55 lbs. of milk daily for the week preceding the beginning of the test. All four groups averaged approximately 69 lbs. of milk per cow daily at the start of the test.

During the 10 week test period, the four groups continued to be fed the same corn silage forage, but each group was fed a different concentrate. The silage was analyzed to establish its nutritional content, and the concentrates were formulated to have different protein-related nutritional factors. One group was fed a total ration (forage and concentrate) having a total protein content (as a percent of dry matter in the total ration) of 12.6%, which is less than the amount recommended by the National Research Council (NRC) for high producing cows(16%). The other three groups were fed concentrates which provided a total ration having protein contents slightly higher than that recommended (17.8%, 18.8% and 18.5% for the second, third and fourth groups, respectively). The amount of total ration fed to each individual cow was adjusted so that total protein intake was approximately equal to NRC requirements for all three groups.

The total rations for the first (low protein) group and the second group differed in the respect that essentially all of the protein added to increase the total protein in the ration from 12.6% to 17.8% came from natural sources of soluble protein. The total rations for the first and third groups differed in that part of the supplemental protein added to increase the total protein content from 12.6% to 18.8% of the ration was urea, a nonprotein nitrogen source which is entirely soluble in the rumen. The protein added to the concentrate fed to the fourth group was lowest in solubility. The actual proportion of soluble protein in the rations of the four groups was 31.1%, 38.2%, 43.7% and 21.3%, respectively.

Aside from protein content, nutrient qualities of the rations fed all four groups were essentially the same. For cows producing 75 or more pounds of milk per day the forage to concentrate ratio was 40:60, while for cows producing less than that amount the ratio was 50:50. The purpose of using two different ratios was to assure desired nutrient intake within predictable dry matter intake limits. The forage and concentrate were fed as a total mixed ration on an individual, limited basis to more closely meet trial objectives. The amount fed was adjusted weekly based on dry matter content of the forage and each cow's previous six day production average. Grain mixes for the concentrate portion of the ration were formulated on a least cost linear program based on nutrient composition and protein solubility. Samples of corn silage and each concentrate mix were collected weekly, composited every four weeks and analyzed to provide the data shown in the following table:

TABLE I

The above values are averages from 12 samples. The control values shown on the first line are those of the total mixed ration fed to all cows prior to commencement of the test. The numbers in the Feedstuff column identify concentrate mixes; those with even numbers being those fed in the 40:60 forage to grain ratio and those with the odd numbers being those fed in 50:50 ratio.

Formulation of the experimental concentrate mixes is given in the following table:

TABLE II

Pricing figures in the above table were calculated as of Jan. 27, 1975. The higher cost of the concentrates fed to the cows in the fourth group was more than offset by the significantly higher milk production from this group. Weekly milk production figures for each treatment group were as follows:

TABLE III

When comparing only the three adequate protein treatments, insoluble protein intake explains 55.4% of the variability obtained in milk production of the individual cows. The regression of milk production on insoluble plus soluble protein intake explains 62% of the variability. Adding a third term (soluble protein intake squared) to the regression analysis explains 67.2% of the variation. The regression equation with three terms would be:

$$\text{Milk prod.} = 7.38 \text{ (insol protein intake)} + 22.89 \text{ (sol. protein intake)} - 3.92 \text{ (sol. protein intake}^2)$$

Holding insoluble protein intake constant, this equation would predict a milk production increase until total soluble protein intake exceeded 2.9 lb.

Evaluating only the increased milk production of the three adequate protein treatments versus the deficient group and expressing the increase as a function of insoluble and soluble protein intake relative to the deficient group, yields a different regression analysis. Insoluble protein intake alone explains 64.4% of the variability, insoluble plus soluble protein intake explains 66.1% of the variation, but insoluble plus soluble protein minus soluble protein intake squared explains 86.7% of the variability in milk production (R=0.93). The regression equation is:

$$\text{Increased milk prod.} = 4.01 \text{ (lb insol protein} - 3.1) + 2.06 \text{ (lb sol. protein} - 1.4) - .95 \text{ (lb sol. protein} - 1.4)2$$

This equation is highly significant (P<0.001) and would predict that a maximum production level would be obtained when supplemental soluble protein equals 1.15 lb/cow/day and insoluble protein intake is constant. The 1.15 lb. supplemental soluble protein plus 1.4 lb fed to the deficient group means 2.58 lb would be the total soluble protein which should be fed for maximum production. That predicted maximum soluble protein intake of about 2.6–2.9 lb/cow/day would vary, however, depending on energy intake and individual cow variation.

Milk production for the three adequate protein treatment groups ranged from 43.9 to 90.4 lb/cow/day for the 10 week average. The range in soluble protein intake was 1.3 to 3.8 lb/cow/day and insoluble protein intake ranged from 3.3 to 7.4 lb/cow/day.

Average urea intake by cows on the high sol. $c$ urea treatment was 0.37 lb/cow/day. Assuming 100% soluble protein equivalency of the urea nitrogen, the urea provided 0.97 lb of soluble protein intake. Total soluble protein intake for the high sol $c$ urea treatment groups averaged 3.1 lb/cow/day which is above the predicted maximum. However, had the urea been totally without value (as suggested by prior dairy studies) to these cows averaging 62.8 lb milk daily, the predicted milk production would be:

$$\text{Milk} = 7.38 \text{ (4 lb insol. protein intake)} + 22.89 \text{ (3.1 lb sol. protein intake)} - .97) - 3.92 \text{ (3.1 lb sol. protein intake} - .97)2$$
$$\text{Milk} = 60.5 \text{ lb/cow/day}$$

Results of the above-described test indicated that there is a definite difference in utilization of soluble and insoluble protein by high producing dairy cows. Also, there apparently is a maximum amount of soluble protein which can be used to meet protein requirements of the high producing cow. This maximum appeared to be 2.6 to 2.9 pounds per day. This test, however, was under highly controlled, closely supervised conditions. The nutritional principles established by this research were applied in actual farm situations in trials to establish validity of the principles under widely varying commercial conditions.

The trial was conducted on twelve separate, commercial dairy herds located in Connecticut, Massachusetts, New Jersey, New York, Pennsylvania and West Virginia. Herds in the testing program had a Dairy Herd Improvement Association rolling herd milk production average (production for immediate past 12 month period) of over 15,000 pounds of milk per cow. That is, the trial was conducted on herds consisting of cows already producing high quantities of milk. Within herds, lactating cows less than 210 days postpartum were balanced into two groups based on age, milk production and days postpartum. These cows were housed and individually fed in confinement stall barns and remained on the trial for three monthly production periods.

Both of the two groups in each herd were fed the same forage (corn silage plus hay and in some cases, hay crop silage) and samples of the actual forage fed to each herd were collected monthly, dried, stored, composited, and analyzed. Data obtained from forage analysis included percent dry matter, total protein, acid detergent fiber (ADF), ADF-bound protein and protein solubility. It is important to note that the test procedure used for establishing the protein solubility was that set forth in "Measurement of Protein Solubility in Common Feedstuffs" by J. E. Wohlt, et al published in the *Journal of Dairy Science*, Vol. 56, at page 1052 (1973). The results of laboratory analysis of the various forages fed to each test herd are shown in the following table:

TABLE IV

As previously indicated, the forage was fed ad libitum to each herd, and a feeding program was devised for each herd based on prior art methods of calculating nutritional requirements. That is, standards for determining the total protein, energy (caloric values), vitamins and minerals recommended in the total daily ration, taking into account the cow's body weight, milk fat test and normal production level (these factors normally being averaged for all cows in a given herd) are provided in "Nutrient Requirements of Dairy Cattle" (4th Ed., 1971) published by National Academy of Sciences, Washington, D.C. The feeding programs, in terms of the average amounts of concentrate and forage (by type) consumed by each cow per day are reflected in the following table:

TABLE V

The only variable of statistical significance in the total rations fed to the two groups of each herd was the proportion of total protein in the concentrate which was soluble. The nutrient density of the total ration of both groups was essentially the same, but one group was fed a concentrate having an average of 21.0% soluble protein (indicated in the following tables as "Hi") and the other group was fed a concentrate having an average of 14.3% soluble protein ("Lo"). Total protein content and protein solubility of the concentrates fed to each herd are indicated in the following table:

TABLE VI

The soluble protein content in the total rations of each test herd was as follows:

TABLE VII

The twelve herds included a total of 173 cows fed the "Lo" concentrate; these cows had an average daily milk production during the test period of 55.6 pounds, while 172 cows fed the "Hi" concentrate produced an average of 53.4 pounds per day. This difference was statistically significant at a probability of less than 0.01, i.e., the probability was at least 99% that the higher production was due to application of the invention and not to chance. There was no significant difference between milkfat tests in the two groups. Prior to commencement of the trial, the cows in the group fed the "Hi" concentrate had a slightly higher average daily production (59.0 lbs/cow/day) then those in the group fed the "Lo" concentrate (58.2 lbs/cow/day) but the final data were adjusted to reflect this difference.

Actual production figures for the twelve individual test herds during the testing periods are as follows:

TABLE VIII

The difference in production levels for the cows on the "Hi" and "Lo" concentrates was essentially the same when grouped according to forage program, stage of lactation, and daily production level.

From the foregoing, it is apparent that a total ration wherein not more than 25% of the total protein requirements are soluble in the rumen will result in superior milk production.

TABLE I

| Feedstuff | Dry Matter (%) | Total Protein | ADF | Ca | P | ADF-bound Protein | Protein Solubility (%) | Treatment Group |
|---|---|---|---|---|---|---|---|---|
| Control | 34.8 | 15.8 | 23.4 | .45 | .35 | 1.17 | 41.4 | all |
| Corn Silage | 27.6 | 9.7 | 28.2 | .23 | .20 | 1.21 | 49.7 ± 9.4 | all |
| 1690 | 88.3 | 16.0 | 14.3 | .83 | .63 | 1.05 | 21.7 ± 3.3 | 1 |
| 1691 | 87.4 | 15.7 | 11.2 | .90 | .62 | 1.35 | 18.9 ± 5.9 | 1 |
| 1692 | 87.5 | 24.0 | 13.6 | .51 | .59 | 1.44 | 30.3 ± 3.3 | 2 |
| 1693 | 88.0 | 27.1 | 11.8 | .56 | .65 | 1.35 | 34.5 ± 7.7 | 2 |
| 1694 | 87.5 | 25.7 | 14.6 | .75 | .46 | 1.24 | 43.0 ± 6.2 | 3 |
| 1695 | 87.7 | 29.8 | 10.3 | .91 | .67 | .66 | 40.9 ± 9.3 | 3 |
| 1696 | 88.8 | 25.7 | 17.0 | .72 | .65 | 2.89 | 13.3 ± 8.6 | 4 |
| 1697 | 88.4 | 28.6 | 11.6 | .81 | .63 | 2.07 | 10.7 ± 3.2 | 4 |

TABLE II

| | Treatment Group | | | | | | | |
|---|---|---|---|---|---|---|---|---|
| | % of formula | | | | | | | |
| Ingredient | 1690 | 1691 | 1692 | 1693 | 1694 | 1695 | 1696 | 1697 |
| Corn meal | 2.85 | — | — | — | — | — | — | — |
| Gluten feed | — | — | 68.65 | 70.1 | 20.25 | 5.9 | — | — |
| Hominy feed | 16.3 | 47.3 | — | — | — | — | 11.1 | 35.45 |
| Grd. oats | 35.85 | — | 2 | — | 29.45 | 7.95 | — | — |
| Oat hulls | .3 | — | — | — | — | — | — | — |
| Brewers grains | 7.5 | 14.05 | 17.1 | — | 11.15 | — | 34.5 | 24 |

TABLE II-continued

| | Treatment Group % of formula | | | | | | | |
|---|---|---|---|---|---|---|---|---|
| Ingredient | 1690 | 1691 | 1692 | 1693 | 1694 | 1695 | 1696 | 1697 |
| DD grains | — | 1.8 | — | 10.7 | — | 1.4 | 25.8 | — |
| Wheat bran | 28.15 | 25.7 | — | — | — | — | 15.15 | 1.25 |
| Midd | — | — | 1.25 | — | 24.15 | 56.8 | — | — |
| Soybean meal 48% | — | — | 2.35 | 12.4 | 4.55 | 15.35 | 4.6 | 28.45 |
| Urea 42% | — | — | — | — | 1.55 | 1.9 | — | — |
| Molasses | 6.15 | 7.5 | 6.15 | 3.9 | 6.15 | 7.55 | 6.15 | 7.4 |
| Salt | 1 | 1 | 1 | 1 | 1 | 1 | 1 | 1 |
| Grd. limestone | 1.7 | 2 | 1.35 | 1.75 | 1.6 | 2 | 1.55 | 1.55 |
| Dical phosphate | — | .2 | — | — | — | — | — | .75 |
| Dynamate | — | .25 | — | — | — | — | — | — |
| G-Quad Mico 3 | .05 | .05 | .05 | .05 | .05 | .05 | .05 | .05 |
| Vitamin ADE | .15 | .15 | .1 | .1 | .1 | .1 | .1 | .1 |
| Theoretical NEmilk (Mcal/lb) | .76 | .83 | .79 | .84 | .76 | .79 | .77 | .84 |
| Unit price/ton | 153.60 | 151.60 | 143.60 | 149.60 | 155.60 | 158.60 | 161.60 | 163.60 |

TABLE III

| | TREATMENT GROUP | | | |
|---|---|---|---|---|
| Week | 1 | 2 | 3 | 4 |
| | | lb. milk/cow/day | | |
| 1 | 66.3 | 69.6 | 68.4 | 72.5 |
| 2 | 63.2 | 69.6 | 67.8 | 73.2 |
| 3 | 61.5 | 68.6 | 66.4 | 72.5 |
| 4 | 60.3 | 66.5 | 65.9 | 73.5 |
| 5 | 58.2 | 64.6 | 63.4 | 72.6 |
| 6 | 57.8 | 62.6 | 61.7 | 69.2 |
| 7 | 56.1 | 62.3 | 60.1 | 69.6 |
| 8 | 54.8 | 60.7 | 60.9 | 68.4 |
| 9 | 53.9 | 59.0 | 58.1 | 66.2 |
| 10 | 53.0 | 56.6 | 55.4 | 63.4 |
| 10 Week Average | 58.5 | 64.0 | 62.8 | 70.1 |

TABLE IV

| Herd | | % Dry Matter | Total Protein | Soluble Protein | Acid Detergent Fiber | ADP Bound Protein |
|---|---|---|---|---|---|---|
| | | | % on DM basis | | | |
| 1 | Corn Silage | 34 | 7.8 | 47.1 | 22.7 | .65 |
| | Hay | 90 | 20.3 | 30.2 | 34.5 | 1.25 |
| 2 | Corn Silage | 36 | 8.5 | 39.9 | 24.7 | .95 |
| | 1st Cut Hay | 90 | 12.9 | 27.8 | 38.8 | 1.05 |
| | 2nd Cut Hay | 90 | 18.2 | 27.8 | 35.4 | 1.30 |
| 3 | Corn Silage | 34 | 10.3 | 40.8 | 26.5 | 1.05 |
| | Haycrop Silage | 55 | 12.6 | 46.1 | 43.9 | 2.15 |
| | Hay | 90 | 19.2 | 25.0 | 34.8 | 1.95 |
| 4 | Corn Silage | 35 | 8.6 | 42.2 | 33.3 | 1.05 |
| | 2nd Cut Hay | 90 | 16.2 | 19.3 | 35.8 | .45 |
| 5 | Corn Silage | 29 | 7.9 | 26.6 | 30.3 | 1.70 |
| | Hay | 90 | 18.0 | 26.6 | 35.4 | 1.45 |
| 6 | Corn Silage | 34 | 9.5 | 36.9 | 22.5 | 1.20 |
| | Hay | 90 | 17.9 | 23.7 | 33.7 | 1.55 |
| 7 | Corn Silage | 28 | 7.8 | 42.2 | 28.5 | .85 |
| | Hay | 90 | 17.0 | 21.1 | 33.5 | 1.75 |
| 8 | Corn Silage | 29 | 7.2 | 44.7 | 27.8 | .80 |
| | 1st Cut Hay | 90 | 12.3 | 29.1 | 39.0 | .85 |
| | 2nd Cut Hay | 90 | 16.4 | 29.1 | 33.9 | 1.25 |
| 9 | Corn Silage | 33 | 8.1 | 44.8 | 28.4 | 1.15 |
| | Haycrop Silage | 40 | 14.8 | 42.1 | 39.9 | 1.95 |
| | Hay | 90 | 15.0 | 23.7 | 32.4 | 1.85 |
| 10 | Corn Silage | 35 | 9.3 | 34.2 | 19.2 | .95 |
| | Haycrop Silage | 39 | 11.9 | 34.2 | 48.4 | 3.25 |
| | Hay | 90 | 8.7 | 25.0 | 38.4 | .65 |
| 11 | Corn Silage | 26 | 8.3 | 38.3 | 30.6 | .95 |
| | Hay | 90 | 10.6 | 15.9 | 35.9 | 1.35 |
| 12 | Corn Silage | 29 | 7.5 | 37.0 | 28.5 | 1.25 |
| | Hay | 30 | 9.2 | 23.8 | 34.2 | 1.10 |

TABLE V

| Farm | Grain Formulation | Amt. | Corn Silage | Haycrop Silage | Hay (1st Cut) | Hay (2nd Cut) |
|---|---|---|---|---|---|---|
| | | | lb/cow/day | | | |
| 1 | 330 | 15.0 | 50 | — | — | 11 |
| 2 | 430 | 17.5 | 30 | — | 9 | 7 |
| 3 | 430 | 22.0 | 19 | 27 | 4 | — |
| 4 | 330 | 17.0 | 71 | — | — | 3.5 |
| 5 | 330 | 16.0 | 66 | — | — | 5 |
| 6 | 380 | 21.5 | 36 | — | 8 | — |
| 7 | 380 | 21.5 | 70 | — | 6 | — |
| 8 | 380 | 22.5 | 40 | — | 5 | 5 |
| 9 | 330 | 22.0 | 32 | 14 | 4.5 | — |
| 10 | 430 | 23.0 | 17 | 25 | 3 | — |
| 11 | 330 | 21.0 | 45 | — | 10 | — |
| 12 | 380 | 24.0 | 40 | — | 11 | — |

TABLE VI

| Farm | Total Protein (% as fed) | | Protein Solubility (%) | |
|---|---|---|---|---|
| | Lo | Hi | Lo | Hi |
| 1 | 25.2 | 24.9 | 14.1 | 18.5 |
| 2 | 20.8 | 20.9 | 13.7 | 18.7 |
| 3 | 20.2 | 20.2 | 15.3 | 18.1 |
| 4 | 25.4 | 25.8 | 13.6 | 21.6 |
| 5 | 25.6 | 25.7 | 12.9 | 18.8 |
| 6 | 21.4 | 21.6 | 13.6 | 20.1 |
| 7 | 23.4 | 21.8 | 11.7 | 22.9 |
| 8 | 21.1 | 20.4 | 13.5 | 21.2 |
| 9 | 24.2 | 25.0 | 16.3 | 23.0 |
| 10 | 22.1 | 20.7 | 17.1 | 24.2 |
| 11 | 25.8 | 26.2 | 15.0 | 21.6 |
| 12 | 22.7 | 22.3 | 15.2 | 23.0 |
| AVG. | 23.2 | 23.0 | 14.3±3.8 | 21.0±4.2 |

TABLE VII

| Farm | Concentrate I.D. # | % of Total Protein From Grain | Forage Soluble Protein | lb/cow/day Grain Sol. Protein | | Total Sol. Protein | | % Soluble Prot. in Ratio | |
|---|---|---|---|---|---|---|---|---|---|
| | | | | Lo | Hi | Lo | Hi | Lo | Hi |
| 1 | 330 | 53 | 1.23 | .53 | .69 | 1.76 | 1.92 | 24.8 | 27.2 |
| 2 | 430 | 54 | .98 | .50 | .68 | 1.48 | 1.66 | 21.9 | 24.5 |
| 3 | 430 | 58 | 1.31 | .68 | .80 | 1.99 | 2.11 | 25.9 | 27.5 |
| 4 | 330 | 62 | 1.00 | .59 | .95 | 1.59 | 1.95 | 22.8 | 27.7 |
| 5 | 330 | 64 | .62 | .53 | .77 | 1.15 | 1.39 | 17.8 | 21.6 |
| 6 | 380 | 65 | .73 | .63 | .93 | 1.36 | 1.66 | 19.3 | 23.5 |
| 7 | 380 | 67 | .84 | .59 | 1.07 | 1.43 | 1.91 | 19.1 | 26.8 |
| 8 | 380 | 69 | .75 | .64 | .97 | 1.39 | 1.72 | 20.2 | 25.6 |
| 9 | 330 | 70 | .88 | .87 | 1.27 | 1.75 | 2.15 | 22.9 | 27.5 |
| 10 | 430 | 72 | .65 | .87 | 1.15 | 1.52 | 1.80 | 21.5 | 26.8 |
| 11 | 330 | 74 | .52 | .81 | 1.19 | 1.33 | 1.71 | 18.3 | 23.1 |
| 12 | 380 | 75 | .54 | .83 | 1.23 | 1.37 | 1.77 | 18.9 | 24.8 |
| AVG. | | 65 | .84 | .67 | .98 | 1.51 | 1.81 | 21.2 | 25.8 |

TABLE VIII

| Farm | Milk Prod. (lb/day) | | Difference for |
|---|---|---|---|
| | Lo | Hi | Lo |
| 1 | 56.7 | 55.3 | +1.4 |
| 2 | 52.3 | 48.2 | +4.1 |
| 3 | 58.9 | 54.4 | +4.5 |
| 4 | 48.7 | 48.3 | +0.4 |
| 5 | 58.8 | 54.4 | +4.4 |
| 6 | 61.5 | 56.2 | +5.3 |
| 7 | 49.8 | 45.0 | +4.8 |
| 8 | 59.5 | 56.1 | +3.4 |
| 9 | 59.2 | 57.6 | +1.6 |
| 10 | 53.6 | 55.3 | −1.7 |
| 11 | 59.7 | 57.7 | +2.0 |
| 12 | 51.5 | 51.6 | −0.1 |

What is claimed is:

1. A method of formulating dairy cattle rations for optimized milk production comprising the steps of:
   (a) establishing the total protein requirements for specified lactating dairy cow(s);
   (b) determining the amount and proportion of soluble and insoluble protein in each of the components of the total ration to be fed to said cow(s); and
   (c) adjusting the proportion and composition of at least one of said components to provide said total protein requirements and to adjust the proportion of soluble and insoluble protein to a level wherein at least 15% but not more than 25% of said total protein is soluble in the rumen of said cow(s).

2. The method according to claim 1 wherein said total ration includes a forage portion and a concentrate portion.

3. The method according to claim 2 wherein the proportion and composition of said concentrate portion is adjusted as required to provide said total protein requirements and adjust the proportion of soluble and insoluble protein.

4. A method of formulating dairy cattle rations for otpimized milk production comprising the steps of:
   (a) establishing a total protein requirement based on average body weight, milk fat test and daily production of the cows in a herd;
   (b) feeding the cows a forage ration ad libitum;
   (c) estimating the amount of total protein provided by the forage consumed;
   (d) determining the additional protein required to provide said total protein requirement;
   (e) determining the proportion of the total protein in the forage which is soluble in the rumen; and
   (f) formulating a concentrate having a percentage of soluble and insoluble protein such that a quantity of said concentrate provides said total protein requirement when added to said total amount of forage consumed and wherein at least 15% but not more than 25% of said total protein is soluble in the rumen.

5. The method according to claim 4 wherein the proportion of said total protein which is soluble in the rumen is approximately 20%.

* * * * *